H. HEUSER.
PROCESS OF BREWING.
APPLICATION FILED MAY 23, 1912.

1,099,746.

Patented June 9, 1914.

Witnesses—

Inventor—
Herman Heuser.
by his Attorneys
Howson & Howson

UNITED STATES PATENT OFFICE.

HERMAN HEUSER, OF CHATTANOOGA, TENNESSEE.

PROCESS OF BREWING.

1,099,746.	Specification of Letters Patent.	Patented June 9, 1914.

Application filed May 23, 1912. Serial No. 699,247.

*To all whom it may concern:*

Be it known that I, HERMAN HEUSER, a citizen of the United States, and a resident of Chattanooga, Hamilton county, Tennessee, have invented certain Improvements in the Art or Process of Brewing, of which the following is a specification.

My invention relates to the art or process of brewing, and the object of my invention is to provide an improved process of brewing beer and similar malt liquors, more fully set forth hereinafter.

The usual process of brewing involves as the essential steps first the production of wort, then boiling the wort with hops and cooling the same, further fermenting the wort and cooling the same, further storing at almost freezing temperature the fermented wort which is now beer proper, and finally making the beer ready for the market by kraeusening the same, *i. e.*, the addition of beer in the first stage of fermentation.

For many years, the brewing industry has been dominated by the theory of cooling, until under the present practice the beer after its main fermentation is subjected to an almost continuous process of cooling up to the time it is put in the trade packages. Notwithstanding this fact, I consider my invention, comprising the heating of beer, to be an improvement in the art of brewing.

My invention consists more particularly in subjecting the beer after its main fermentation to the action of heat for the purpose of maintaining the beer in the chip casks at a temperature at which fermentation may be carried on more vigorously than is the case with the present method or process of brewing.

The fermented beer after proper storage is commonly introduced to the chip casks at the temperature it took up during storage; that is to say, at 32°–34° F., and is mixed in the chip casks with 12% to 25% of kraeusen, and then made to ferment under a pressure of about 5 pounds above the atmosphere. The object of mixing beer in the first stage of fermentation with the stored beer, or "kraeusening" as it is termed, is to invite fermentation by the introduction of a large amount of fermentable matter and to saturate the beer under pressure by such fermentation with carbonic acid, ($CO_2$).

Figure 1:
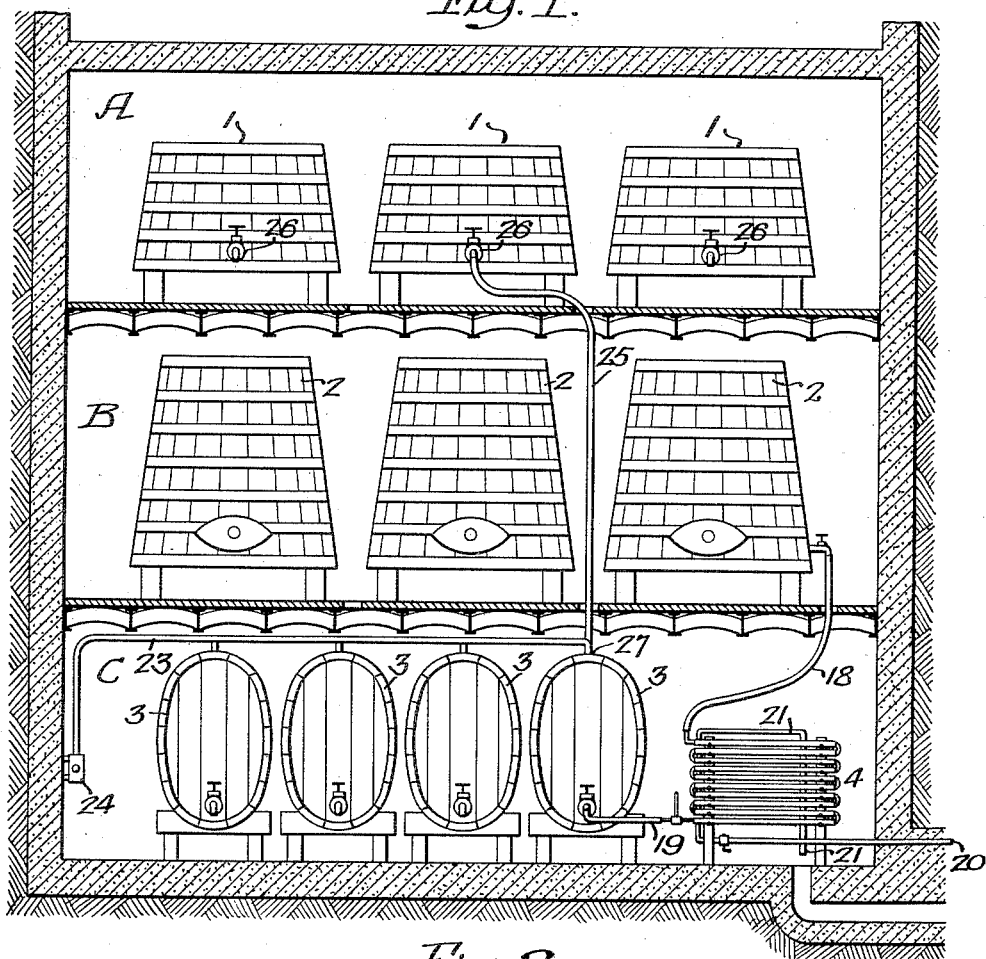
Figure 2:
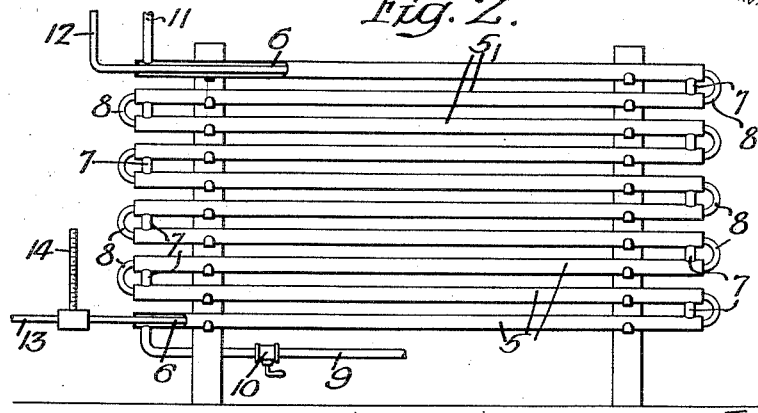

Apparatus employed in carrying out my improved process, which is more fully described hereinafter, is shown in the accompanying drawings, in which:

Figure 1, is a view of a brewery cellar arrangement, and Fig. 2, is an enlarged view of a heating device which I may employ in carrying out my improved process.

Fig. 1 of the drawings represents a brewery cellar arrangement consisting of fermenting cellar A with fermenting vessels 1, storage cellar B with storage tanks 2, and chip-cask cellar C containing the oval shaped chip casks 3. In the chip cask cellar C, a heating apparatus 4 may be placed, comprising a plurality of horizontally placed tubes 5, ten in number for instance, which may be of steel, with the same number of copper tubes 6; the former jacketing or enveloping the latter. The tubes 5 are connected with each other at alternate ends by means of pipes 7, and the tubes 6 are joined together by hollow bends 8. The tubes 5 communicate at their lower end with a pipe 9 provided with a valve or spigot 10, and at their upper end with a pipe 11. The tubes 6 have an inlet connection at 12, and an outlet at 13. A thermometer 14 may be connected with said outlet 13. The inlet 12 to the tubes 6 of the heating apparatus may be connected by means of a hose 18 with one of the storage tanks 2, and the outlet 13 may be connected by means of a hose 19 with one of the chip casks 3. The inlet 9 of the tubes 5 may be connected to a pipe 20 leading from a suitable source of the hot water supply, while the outlet 11 of said tubes may be connected to a pipe 21 leading to waste. The chip casks 3 are connected by a pipe 23 with a $CO_2$ pressure regulator 24. A hose 25 connected to a valved spigot 26 of one of the fermenting vessels 1 leads into a chip cask 3 through a bunghole 27 on top of said cask. After being stored for the proper length of time, the beer in tanks 2 is transferred, preferably by a closed conduit as the hose 18, to the heating apparatus 4. Just before it commences to flow, the valve or spigot 10 is opened and hot water from the source of supply enters the tubes 5 of the heater at point 9. Such water, at a temperature of about $144\frac{1}{2}$° F., traverses upward through the heater from one tube 5 to another by means of the connecting pipes 7. When the water reaches the top tube, it is discharged as comparatively cold water through outlet 11 into the pipe 21, thence passing to waste. If desired, however, this water may be collected and used for one purpose or another, for instance, being pretty cold, it can be used with advantage for cellar cleaning. As soon as the hot water flows into the heater, beer may be drawn from one of the storage tanks 3 and passed through hose 18 into the heater 4 at the inlet 12 to the tubes 6, and traversing downward from one tube to another it passes through the heater in a direction opposite to the flow of the water in the tubes 5. By such counter flow the absorption of heat by the beer from the hot water is greatly promoted. From the heater, the beer is introduced into chip cask 3, through hose 19. When about half of the chip cask is filled with beer thus treated, the flow of the same is stopped. The valved spigot 26 of one of the fermenting vessels 1 is opened and about 14% young beer in the first stage of fermentation is passed into the chip cask 3 through hose 25. When the beer has been thus "kraeusened," the introduction of the beer into the chip cask and the heating of same to the proper temperature is resumed and kept up until the chip cask is filled to the proper height.

While the beer is flowing through the heater, the thermometer indicating the temperature of the flowing beer should be carefully watched. If it shows too high a temperature the hot water flow should be checked by the valve or spigot 10 to such an extent as to insure that the beer flows with a temperature of about 40° F. If the thermometer indication is below 40° F., the spigot 10 should be opened wide enough to raise the temperature of the beer to 40° F. and to keep it there. If provision for hot water supply with strong current has been made, the entire regulation of the temperature of beer may preferably be done by manipulation of the valve or spigot 10 alone, leaving the flow of the beer undisturbed. A day or two after the chip cask has been properly filled, the beer is subjected to the usual isinglass treatment. The bunghole on top of cask is then tightly closed, and from now on the fermentation is proceeding under pressure. When the pressure produced by the production of $CO_2$ gas in the beer has reached 5 lbs., the excess of $CO_2$ gas passes off through pipe 23 to the pressure regulator 24, which is set at 5 lbs. The beer gets gradually more and more saturated with $CO_2$ and at the same time becomes clearer. When the fermentation has proceeded for a certain length of time, say three weeks, the beer is considered ready for the market.

When the chip casks are provided with a cooling device, I prefer to heat the beer up to 42° F. and then, when the chip cask fermentation is most vigorously going on, I turn on the cooling device of the same and lower the temperature of the beer to $36\frac{1}{2}$° F. for draft been and to 30° F. for bottle beer. Such a high starting temperature invites a rapid fermentation and, for bottle beer, enables me to reduce the amount of "kraeusen" to the minimum. This is a great step toward increasing the stability of bottled beer, for any reduction in the percentage of "kraeusen" promotes the stability of beer. Even sugar "kraeusen", which is void of yeast-food, ferments very well in chip cask with the application of such treatment. Now, during the time the beer is in chip cask, it will be observed that the fermentation is more vigorous and the clarification proceeds with much greater satisfaction than in beers which have not been treated as outlined above. However, the more vigorous the fermentation, the better the saturation of the beer with $CO_2$. This is of the greatest importance, because a beer better saturated with $CO_2$ produces a creamier head when poured into a glass, and it also keeps freer from bacterial growth while in chip cask and in the trade-packages, and being fermented to an extremely high degree, it is more wholesome than beers which have undergone a less satisfactory chip cask fermentation. Further, a peculiar feature of my process is the splendid clarification of the beer in chip cask, and it is such clarification which renders the beer more immune against yeast taste so objectionable to the consumer of beer. Further the beer calculated to be ready for the market at a certain time will, with the application of my process of brewing, be ready in time, whereas with the present process of brewing the beer is frequently still unfinished when it should be ready, and thus it happens that so much unfinished beer is being put upon the market. In fact, nothing is more annoying to the brewer than a slow chip cask fermentation. As means to prevent the same, the brewer adds a greater percentage of "kraeusen" to the beer in chip cask, or he uses more yeast for the young beer destined to be mixed with the stored beer in chip cask. However, both means are frequently liable to impair the taste, flavor and wholesomeness of the beer. As a matter of fact, fear of slow chip cask fermentation is the real reason why carbonating of beer, that is, artificial impregnation of same with $CO_2$, has gained so many admirers among the brewers and found so much practical application nowadays. The purpose of the chip cask is to ferment the "kraeusen" added to the beer; further to clarify the beer; further to saturate the same with $CO_2$, and further to store the same until it is ready and needed for the market.

Though I have illustrated and described my process with particular reference to the subjecting of beer in transit to a process of heating, I do not desire to limit myself to such heating arrangement. I desire to cover the heating of beer in general after it has passed through the fermentation in the fermenting cellar until it leaves the chip cask to be filled into trade-packages. Nor do I desire to limit myself to beer, since ale, porter and stout may be similarly treated. It is evident that steam can be used as the heating agent, or properly applied electrical apparatus may be used, and any kind of fuel may be applied directly to the heating apparatus to carry out my improved process of brewing.

I claim:

1. An improved process of brewing, which consists in fermenting the wort, transferring the wort from the fermentation tank to the chip cask, heating the fermented wort on its passage to the chip cask, and adding kraeusen to the fermented wort in the chip cask and allowing the wort to undergo secondary fermentation.

2. An improved process of brewing, which consists in fermenting the wort, transferring the wort from the fermentation tank to the chip cask, heating the wort to approximately 40° F. on its passage to the chip cask, and adding kraeusen to the fermented wort in the chip cask and allowing the wort to undergo secondary fermentation.

In testimony whereof, I have signed my name to this specification, in the presence of two subscribing witnesses.

HERMAN HEUSER.

Witnesses:
S. F. ZBINDEN,
L. B. LOCKWOOD.